RADIO-TELEMETERING WITH PHASE MODULATION
Filed Oct. 28, 1947
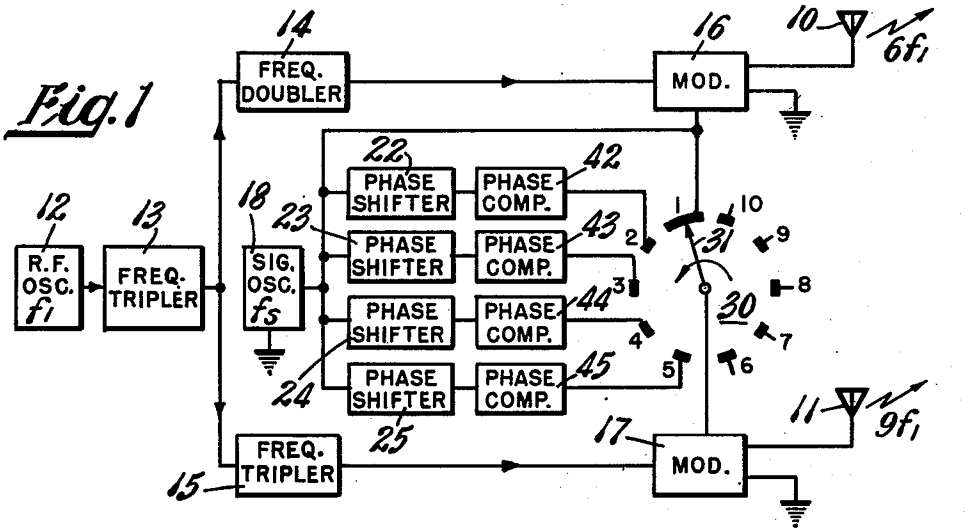
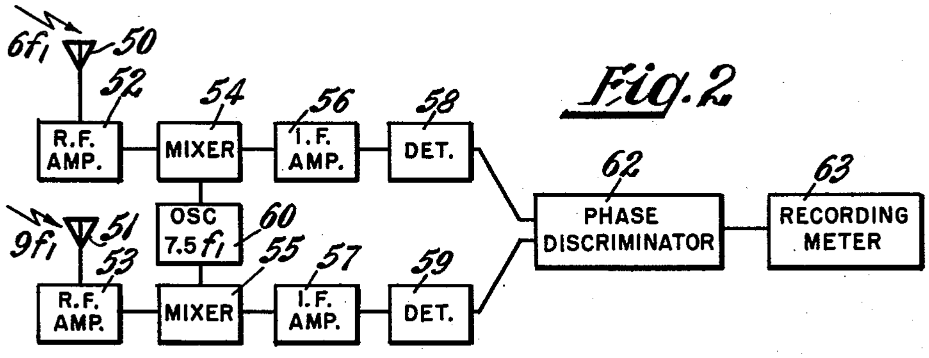
Fig. 3
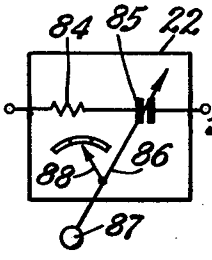
Fig. 4
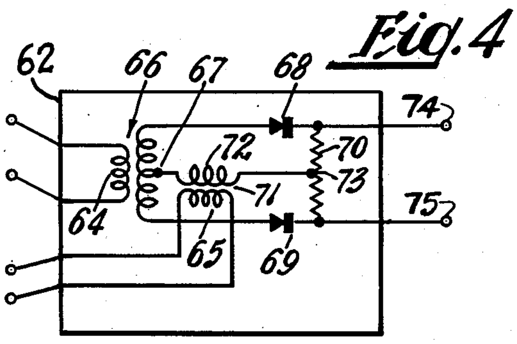
Fig. 5
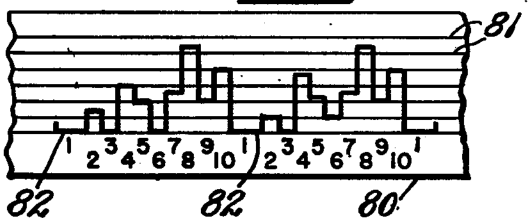
INVENTOR
HARRY B. SCHULTHEIS, JR.
BY E. L. Woodbury
ATTORNEY Patented Oct. 17, 1950

2,526,425

UNITED STATES PATENT OFFICE 2,526,425

RADIO-TELEMETERING WITH PHASE MODULATION

Harry B. Schultheis, Jr., Pacoima, Calif., assignor to Bendix Aviation Corporation, South Bend, Ind., a corporation of Delaware Application October 28, 1947, Serial No. 782,635

5 Claims. (Cl. 177—351)

This invention relates primarily to radio telemetering, although it is also applicable to wire telemetering, and is more particularly limited to that type in which the phase of an alternating current is shifted to transmit the desired reading.

Telemetering by phase modulation is not broadly new. A previously known system transmits a radio wave modulated with two harmonically related audio waves, the phase of one of which is shifted proportional to the magnitude of the reading to be transmitted, whereas the phase of the other remains constant and serves as a reference standard for production at the receiver of a reading proportional to the magnitude of the phase shift of the first wave.

The most serious disadvantage of a system employing harmonically related waves is the need for perfect linearity and distortionless operation. If distortion or nonlinearity exist (which is always the case) new harmonic waves having the same frequency and phase as the desired wave, will be produced, thus generating interference.

This prior known system also has definite limitations because it necessitates the use of audio frequency filters to separate the reference audio wave from the signal audio wave. Such filters are more or less bulky and heavy and detract from the utility of the apparatus where size and weight are factors.

Furthermore, it is frequently desirable to provide a plurality of telemetering channels by time division multiplexing, i. e. successively applying in rapid succession to the carrier wave a plurality of different phase modulated audio waves. The switching of circuits containing filters produces transient phase shifts that impair the accuracy of telemetering readings; this imposes definite limitations on the number of channels that can be obtained by time division multiplexing and upon the maximum rate at which such switching can be performed.

In accordance with the present invention, I have discovered that the usual audio frequency filters and their listed disadvantages can be eliminated by the simple expedient of transmitting the reference and the signal audio waves on two separate carriers instead of on the same carrier. Although this necessitates two separate transmitters and receivers, the duplication of this equipment is much less objectionable than is the use of audio filter circuits in conjunction with a single carrier.

An object of the invention is to simplify and reduce the cost, weight, and bulk of telemetering systems of the phase modulation type.

Another object is to increase the number of channels available with a given number of carrier waves, in a phase modulation telemetering system.

Another object is to reduce the power requirements of a telemetering system.

Another object is to provide a telemetering system in which calibration and adjustment are simplified.

Some advantages of the present system will be apparent from the following:

(a) A 40 channel phase comparison system in accordance with the present invention weighs somewhat less than the best 10 channel system previously known to me and has approximately only 60% of the bulk of the prior system. This makes the system particularly adapted for use on airborne equipment.

(b) A 40 channel phase comparison system requires approximately 20% less power than the best 10 channel prior system known to me.

(c) Either variable resistance or variable reactance instrument-actuated units may be employed for the phase modulation.

(d) The present system is virtually unaffected by changes in supply voltages or oscillator frequencies.

(e) The system is capable of operating at extremely low values of signal to noise ratio.

(f) Calibration and adjustment is simpler than in prior systems known to me.

(g) The equipment at the receiving end is simple and comparatively inexpensive.

A typical system in accordance with the present invention will now be described with reference to the drawing, in which:

Fig. 1 is a schematic circuit of the apparatus at a transmitting station;

Fig. 2 is a schematic circuit of the apparatus at a receiving station;

Fig. 3 is a circuit illustrating one form of phase modulator that can be employed as a transducer or sensing instrument;

Fig. 4 is a circuit of a phase detector or phase discriminator that may be employed at the receiving end; and Fig. 5 is a view of a section of tape or film illustrating the manner in which the detected signals can be recorded.

Referring first to Fig. 1, there is shown a radio transmitter in accordance with the invention for transmitting a plurality of telemetering signals. The system includes two transmitting antennas 10 and 11, respectively, from which two radio waves modulated with subcarrier frequency waves are transmitted. A reference wave of one carrier frequency is transmitted from the antenna 10, and a signal wave of a second carrier frequency is transmitted from the antenna 11.

For the purpose of maintaining a constant difference in frequency between the two carriers, both carrier waves may be derived from a common oscillator. Thus there is indicated a radio frequency oscillator 12 of frequency designated for convenience $f_1$. The wave of frequency $f_1$ is fed into a frequency tripler 13 which produces a wave of frequency $3f_1$ which is then fed into a frequency doubler 14 and a frequency tripler 15. The output wave from the frequency doubler 14 has a frequency of $6f_1$, which, after being modulated by the reference wave in a modulator 16, is applied to the antenna 10.

The wave of frequency $3f_1$ that is fed into the frequency tripler 15 is converted to a wave of frequency $9f_1$, which after being modulated with the signal waves in a modulator 17, is applied to the antenna 11.

A signal oscillator 18 provides a wave of subcarrier frequency $f_s$ which is applied without phase modulation to the carrier wave of frequency $6f_1$ by the modulator 16, and which subcarrier wave is phase modulated in accordance with the readings to be telemetered and applied to the carrier wave of frequency $9f_1$ by modulator 17. The frequency of the signal wave can be discreetly chosen below an upper limit at which the residual reactance in the entire system becomes appreciable and above a lower limit dictated by the maximum weight and bulk of the phase shifting instruments that it is desirable to use, and by the frequency of sampling that must be employed. A frequency between 10 and 100 kilocycles will meet most requirements.

It will be observed that the output of the signal oscillator 18 is applied in multiple directly to the modulator 16 and to a plurality of phase shifters 22, 23, 24, 25, etc. Each phase shifter may be of known type, usually consisting of a combination of resistors and capacitors or inductances, one of which is variable. A simple form of phase shifter is shown in Fig. 3 as consisting simply of a resistor 84 and a variable capacitor 85 connected in series. The capacitor 85 is adapted to be varied by a shaft 86 which is rotated in accordance with the reading of the variable function that is to be transmitted. As shown, the shaft 86 simply has a knob 87 on its end for manual actuation, and a pointer 88 movable over a scale. For each position of the pointer 88 the capacitor 85 will have a particular capacity which will produce a particular phase shift in the current passing therethrough. It is to be understood that the phase shifter shown in Fig. 3 is for example only, and that the invention is in no sense limited to any particular phase shifting circuit.

There may be as many of the phase shifters 22, 23, 24, 25, etc. as there are channels in the system, and the output currents of the phase shifters are applied successively to the modulator 17 by means of a distributor 30, which comprises a continuously rotating contact 31 which successively contacts a plurality of contacts numbered 1 to 10, consecutively. In the particular circuit shown, there is one contact more than there are channels.

It will be observed that each of the phase shifters 22, 23, 24, etc. is connected to its associated contact 2, 3, 4, etc. through a phase compensator 42, 43, 44, 45, etc. Each phase compensator contains a known form of phase shifting device and may for example be as shown in Fig. 3. The phase compensators are manually adjusted to compensate for any residual phase displacement resulting from inherent impedance conditions in the system. After being initially adjusted, the phase compensators are not altered during a transmission.

It will be observed that contact 1 of the rotary distributor 30 is connected directly to the output of the signal oscillator 18, so that once during each cycle of rotation of the contact 31 a long reference signal having no phase shift is transmitted. This facilitates channel identification.

The apparatus at the receiving station, as illustrated in Fig. 2, comprises separate receiving antennas 50 and 51, respectively, which feed into separate receiving circuits, although separate antennas are not essential. Thus each receiving circuit may include a radio frequency amplifier 52 or 53, a mixer 54 or 55, an intermediate frequency amplifier 56 or 57, and a detector 58 or 59. When the frequencies of the two carrier waves are chosen as indicated, having the relative values of $6f_1$ and $9f_1$, a common local oscillator 60 having a frequency of $7.5f_1$ may be employed. This frequency of $7.5f_1$ beats with both the frequency of $6f_1$ and the frequency of $9f_1$ to produce separate waves of the intermediate frequency of $1.5f_1$ which waves are separately amplified in the I. F. amplifiers 56 and 57 for delivery to the separate detectors 58 and 59.

The detectors 58 and 59 deliver the detected signal and reference currents of the frequency $f_s$ to a phase discriminator 62 which delivers, to a recording meter 63, a current or potential the amplitude of which is a function of the phase of the signal currents relative to that of the reference current. One form of phase discriminator that may be employed is illustrated in Fig. 4 in which the detected reference current of frequency $f_s$ from detector 58 is applied to a transformer winding 64, and the detected signal current of frequency $f_s$ from detector 59 is applied to a transformer winding 65. Winding 64 constitutes the primary winding of a transformer 66 having a center-tapped secondary winding 67, the ends of which are connected through a pair of rectifiers 68 and 69, respectively, to the outer ends of a center tapped resistor 70. The winding 65 constitutes the primary winding of a transformer 71 having a secondary winding 72 which is connected between the mid-tap of winding 67 and the mid-tap of the resistor 70. The windings of the transformer 66 and 71 respectively may be so proportioned that the potential generated in each half of the winding 67 is equal to the potential developed in the winding 72 when equal potentials are applied to the primary windings 64 and 65, respectively. The windings 64 and 65 may be so poled that when the currents therein are in phase—as for instance when the rotating contact 31 (Fig. 1) is on the contact 1—the potential in the winding 72 is equal and opposite to the potential in winding 67 so that the resultant potential between points 73 and 74 is zero, whereas the potentials in windings 72 and the lower half of winding 67 are in phase and produce maximum voltage between the point 73 and 75. If the phase of the current in winding 65 is shifted 180° with respect to the current in winding 64, the situation is reversed, the potential between points 73 and 75 then becoming zero, and the potential between points 73 and 74 reaching its maximum value. It will be apparent therefore that as the phase of the current in the winding 65 varies with respect to the phase of the current in winding 64, the magnitude of the potential between terminals 74 and 75 varies correspondingly.

The recording meter 63 may be of any known type. The resultant record may be as illustrated in Fig. 5, in which a record strip 80 has longitudinal lines 81 thereon representing various amplitudes of the current or potential applied to the meter 63. In the particular system shown in Fig. 1, the rotary distributor 30 has ten contacts, the first of which is relatively long and the other nine of which are short and of equal length. The first, long, contact is connected directly to the signal oscillator 18 so that the current in the recording meter during the interval while the moving contact 31 is moving over the contact 1 is zero, as indicated at 82, 82, in Fig. 5. During the other nine intervals intervening between the readings 82, the amplitude varies according to the phase shift introduced into the signal currents by the phase shifters 22, 23, 24, etc., which phase shifters are adjusted in accordance with the readings that are to be telemetered.

It will be observed from inspection of Figs. 1, 2, 3, and 4 that the apparatus involves no audio or subcarrier frequency filters, which are usually bulky and heavy. Furthermore, because of the absence of such filters, the distributor 30 can have a relatively large number of contacts and be operated at a relatively high speed so as to provide a large number of channels with relatively small lapse of time between the transmission of successive signals in each channel.

Because of the fact that the readings are a function solely of the phase of the signal current relative to the reference current, the system is virtually unaffected by changes in supply voltages or oscillator frequencies, or by extraneous noise. It is very simple to constantly check the system for calibration and adjustment because of the transmission of the reference signal once during each cycle of the distributor 30.

Although for the purpose of explaining the invention, a particular embodiment thereof has been shown and described, obvious modifications will occur to a person skilled in the art, and I do not desire to be limited to the exact details shown and described.

I claim:

1. A telemetering system comprising a transmitting station; a receiving station; and means providing two independent communication channels between said transmitting and receiving stations; means at said transmitting station for producing and transmitting over one of said channels a signal wave, and means for varying the phase of said signal wave in accordance with information to be telemetered; means at said transmitting station for producing and transmitting over said other channel a reference wave of the same frequency and substantially the same wave form as said signal wave and of unvarying phase; means at said receiving station for comparing said signal and reference waves and producing a current of amplitude in accordance with the phase difference between said signal and reference waves; and means for producing from said last-mentioned current an indication in accordance with said amplitude.

2. A system in accordance with claim 1 in which said means providing two independent channels comprises means at the transmitting station for transmitting separate carrier waves of different frequencies modulated with said signal and reference waves respectively, and means at the receiving station for separately detecting the modulations on said carrier waves.

3. A telemetering system comprising a transmitting station; a receiving station; and means providing two independent communication channels between said transmitting and said receiving stations; means at said transmitting station for producing a signal wave; a plurality of phase modulating devices operable in response to individual control thereof; means for applying said signal wave to all said phase modulating devices; distributing means for successively applying wave pulses from said phase modulators to one of said communication channels; means for applying said signal wave continuously to said other communication channel; means at said receiving station for separately receiving signal waves from said two channels; means for comparing the phase of the waves over one channel with the phase of the waves received over the other channel, and means for producing an indication in accordance with the phase difference between the currents received over said two channels.

4. A system according to claim 3 in which said distributing means includes means for transmitting a signal wave pulse alternately with a train of wave pulses derived from said phase modulating devices.

5. A system according to claim 1 in which said means for producing an indication comprises a recorder for continuously recording the amplitude of said last mentioned current.

HARRY B. SCHULTHEIS, Jr.

REFERENCES CITED

The following references are of record in the file of this patent:

UNITED STATES PATENTS

| Number | Name | Date |
|---|---|---|
| 1,933,248 | Evans et al. | Oct. 31, 1933 |
| 2,256,487 | Moseley et al. | Sept. 23, 1941 |
| 2,363,941 | Busignies | Nov. 28, 1944 |
| 2,402,973 | Moore, Jr. | July 2, 1946 |
| 2,430,244 | O'Brien | Nov. 4, 1947 |